Feb. 10, 1942.　　P. H. STANLEY ET AL　　2,272,439
AIRCRAFT SUSTAINING ROTOR BLADE
Filed Dec. 16, 1939　　2 Sheets-Sheet 1
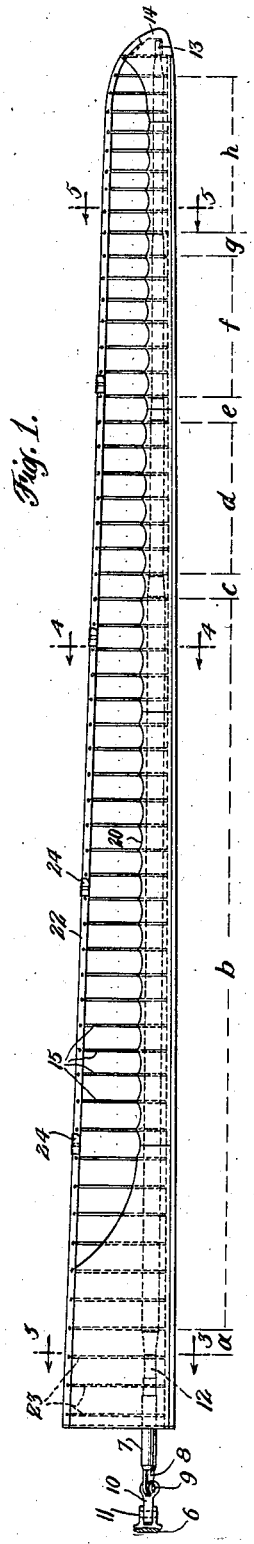
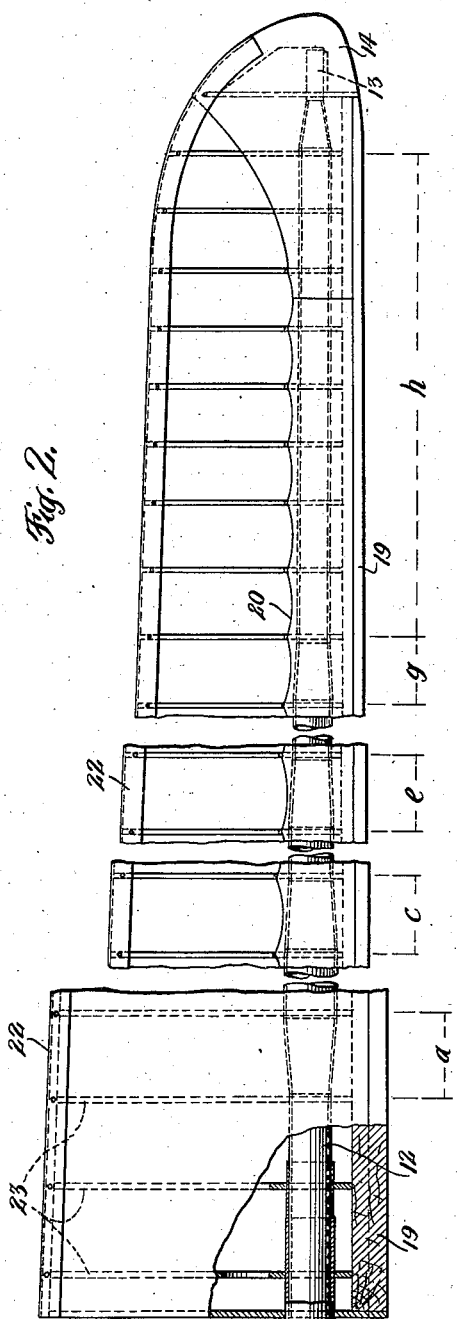
INVENTOR:
Paul H. Stanley
Agnew E. Larsen
Synnestvedt & Lechner
ATTORNEYS.

Feb. 10, 1942.  P. H. STANLEY ET AL  2,272,439
AIRCRAFT SUSTAINING ROTOR BLADE
Filed Dec. 16, 1939   2 Sheets-Sheet 2
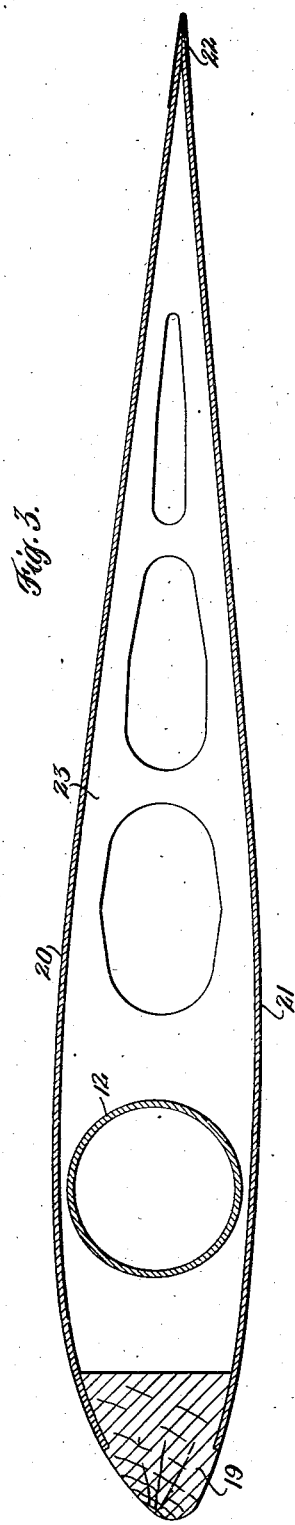
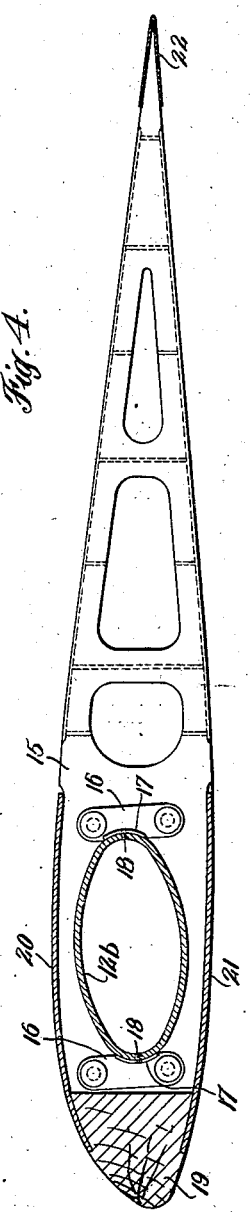
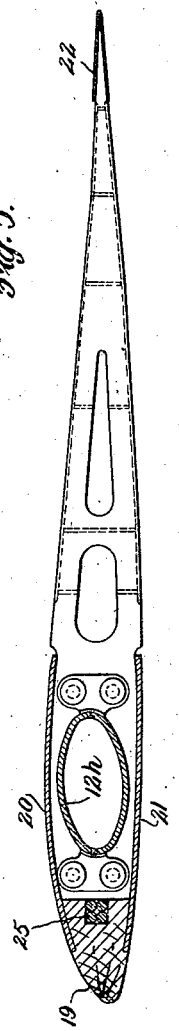
INVENTOR:
Paul H. Stanley
Agnew E. Larsen
BY Symmestvedt & Lechner
ATTORNEYS.

Patented Feb. 10, 1942

2,272,439

UNITED STATES PATENT OFFICE 2,272,439

AIRCRAFT SUSTAINING ROTOR BLADE

Paul H. Stanley, Huntingdon Valley, and Agnew E. Larsen, Jenkintown, Pa., assignors to Autogiro Company of America, Willow Grove, Pa., a corporation of Delaware Application December 16, 1939, Serial No. 309,586

14 Claims. (Cl. 244—18)

This invention relates to aircraft sustaining rotor blades.

As is known, the blades of aircraft sustaining rotors (either mechanically driven or aerodynamically rotated) are subject, under different conditions of flight, to airflow in different directions and at different velocities in each cycle of rotation, especially under a condition of rapid translational flight of the aircraft. Because of these and other factors, the plan form, sectional contour, aerodynamic and structural proportions and other characteristics of the blades are of great importance in providing a high degree of efficiency, as well as smoothness of operation under all conditions of flight.

The present invention contemplates a blade structure having an unusually favorable combination of aerodynamic and structural characteristics, well adapted to meet the varying conditions of flight and airflow.

The important aerodynamic advantages or objects achieved by this invention flow in large part from the following:

The improved blade is of tapered plan form and thickness, the larger cross section being located inboard and the smaller cross section outboard. Preferably, the taper in plan form is substantially uniform from root to tip and the taper in thickness is stepped, there being an inboard section of approximately two-thirds of the blade length of uniform thickness and a plurality of outboard sections of progressively thinner section.

The blade of the present invention is built up on a single primary longitudinal strength member or spar; the longitudinal axis of the spar, the sectional center of gravity of the blade and the sectional center of pressure of the blade all being located well forwardly in all regions of the blade lengthwise thereof, preferably along a line approximately one-quarter of the chord dimension from the leading edge.

Still further, the improved blade has its sectional center of pressure located close to but slightly behind the sectional center of gravity at all points throughout the length of the blade, this being of importance in providing a small negative pitching moment which gives the blade stability in flight.

The blade of the present invention further has considerable torsional rigidity, as well as rigidity in the plane of the blade, while affording relatively high flexibility transversely of its plane, these characteristics being desirable for reasons now well recognized.

The invention also affords a number of important structural advantages some of which are, briefly, simplicity and a high degree of strength, convenience in fabrication and the like. Further structural advantages are pointed out hereinafter in the following description of the specific embodiment illustrated in the accompanying drawings.

Before proceeding with the description of the drawings, however, it is pointed out that most of the aerodynamic and structural advantages of the invention are achieved by the use of a tubular spar of step-tapered elliptical section, said spar constituting the primary longitudinal structural member of the blade and the blade being built up thereon as by means of transverse ribs and other elements, as described more fully hereinafter.

In the drawings—

Figure 1 is a top plan view of a basic structure of a sustaining rotor blade in accordance with this invention;

Figure 2 is an enlarged plan view of the blade of Figure 1 with portions broken out and some shown in section for clarity of illustration; and Figures 3, 4 and 5 are transverse sectional views taken, respectively, on the section lines 3—3, 4—4, 5—5 applied to Figure 1.

As in many aircraft sustaining rotors, the rotor blade of the present invention is adapted to be connected with a rotative hub, shown at 6 in Figure 1, the connection preferably including one or more pivots affording freedom for swinging movement of the blade under the influence of flight forces to compensate for differential lift effects during translational flight, to relieve gyroscopic moments and the like. As shown in Figure 1, the root end fitting 7 for the blade is provided with an apertured lug 8 which is connected by means of a "drag" pivot 9 to a drag link 10, the drag link, in turn, being coupled to the hub by means of a "flapping" pivot 11.

The primary longitudinal structural member or spar preferably has a root end portion 12 of circular cross section (see Figure 3) adapted to be telescoped with a complementary cylindrical part of the root end fitting 7. In the next outboard section $a$ of the spar, the sectional shape changes from circular to elliptical, and this elliptical shape continues uniformly throughout the section $b$ of the blade, i. e., to a point about two-thirds of the blade length from the rotor axis. In portion $c$ the spar tube is tapered to a reduced section, maintaining, however, the elliptical shape which again continues uniformly throughout portion *d*. Two additional tapered portions are provided as indicated at *e* and *g*, the intervening and tip sections *f* and *h* each being of uniform size throughout its length, but the outermost section *h* defining a smaller ellipse than portion *f*. At the outer extremity of the spar a further taper may be employed, terminating in a part 13 to which a member 14 defining the blade tip is adapted to be fastened.

The foregoing spar shape is advantageous from a number of aspects. In addition to providing aerodynamic advantages, it is a practical form of drawn metal tube, which is important from the standpoint of production. With the major cross sectional axis of the elliptical tube lying in the plane of the blade, as shown, a high degree of rigidity in the plane of the blade is provided and, in addition, it is possible to provide the required high degree of strength in a blade of thinner section. The thinner section, in turn, has a number of advantages, including the fact that a uniform taper in plan form may be employed more readily than with a spar of greater depth. Still further, the several stages or steps of taper in the spar make possible convenient reduction of the thickness of the blade in corresponding steps or stages. The provision of several stages of thickness reduction in the outer third of the blade is, moreover, important since, for aerodynamic reasons, it is in this outer region of the blade that it is most important to provide reduced thickness.

In building up the blade on the spar, a multiplicity of transverse ribs are preferably employed. These ribs are designated by the numeral 15, side face views thereof appearing in Figures 4 and 5, wherein it will be seen that each rib is apertured to receive the spar tube. The ribs may desirably be made up of plywood and are secured to the spar by means of clips 16 having wings 17 adapted to be welded to the spar tube as at 18, i. e., on the major diameter of the tube section, which is of advantage since the strength of the tube is impaired least by a weld at this point.

A nose strip 19 extends along the leading edge of the blade, being connected with the ribs by means of upper and lower plywood or other similar sheets 20 and 21. The rear ends of the ribs are connected by a trailing edge stringer 22 which extends substantially throughout the length of the blade, as do the nose strip and the upper and lower plywood sheets 20 and 21. Slip joints 24 are desirably located at spaced points in the trailing edge stringer, so as to avoid distortion thereof upon flexing of the blade.

Toward the inner end of the blade, a few transverse ribs 23 are shaped to cooperate with the portion of the spar having circular cross section, one of these being illustrated in Figure 3. In this region of the blade the upper and lower plywood sheets are of greater width, sufficient, in fact, to cover substantially the entire upper and lower surfaces of the blade, being joined within the trailing edge stringer 22 as shown.

In the portion *b* of the blade length (see Figures 1 and 4), the size of the spar section 12b is maintained uniform so that throughout this length the spar receiving apertures in the ribs need not be graduated in size. Furthermore, attachment clips and the like for the ribs may be of uniform construction throughout this portion of the blade.

In the portion *d* of the blade length, a construction similar to that already described is employed, although the size of the spar is smaller than in portion *b* and the ribs are of correspondingly reduced depth. The same is true of the ribs in portions *f* and *h*, one of the latter of which appears in Figure 5, in which it will be seen that the ellipse of this portion of the spar, indicated at 12h, is very much smaller than in Figure 4.

The entire blade structure shown in Figure 1 and thus far described is covered with fabric and doped in the usual manner.

Several important features of the foregoing structure should be noted, as follows:

While the transverse ribs in each of sections *b*, *d*, *f* and *h* are of progressively smaller chord dimension (in order to give the desired uniformity of taper in plan form), it will be observed that the ribs in any one of these sections all cooperate with a length of spar tubing of uniform shape and size. This is an important consideration from the standpoint of blade production.

Note further that the tapered sections of the spar (see portions *a*, *c*, *e* and *g*) are each of such length as to lie between adjacent ribs. Thus, while the blade is of tapered plan and thickness, it is not necessary at any point to mount the ribs on a tapered surface of the spar.

In considering the location of the spar in the blade, it is pointed out that because of the taper steps and the elliptical shape, it is possible to locate the longitudinal axis of the spar closer and closer to the leading edge of the blade from the root to the tip. This, in its turn, is of importance since it is thereby possible to locate the longitudinal axis of the spar so that, cross sectionally, at any point throughout the length of the blade, the center of the spar lies at a point approximately one-quarter of the chord dimension from the leading edge. Preferably, and as shown, the spar is positioned closer to the leading edge (at about 22% of the chord dimension) than the one-quarter position. By virtue of the foregoing, the sectional center of gravity of the blade is kept well forward, lying along a line approximately 23.25% of the chord dimension from the leading edge in the arrangement illustrated. In accordance with the invention, the blade section is such as to provide a sectional center of pressure at about 25% of the chord dimension from the leading edge, and this relationship between C. P. and C. G. produces a stable, i. e., a negative, pitching moment, thereby enhancing smoothness of operation.

While it may not be necessary in all constructions, we prefer to ballest the nose of the blade in about the outer one-third of its length. Such ballast may conveniently take the form of lead wire 25 recessed in the rear edge of the nose strip 19, as clearly appears in Figure 5. The ballasting need not, however, be of any very great weight, although some is preferably used as an aid in maintaining the sectional center of gravity of the blade in the outer regions thereof in the desired relation to the sectional center of pressure, as above outlined. In this connection it may be noted that the weight ratio between the spar and the remaining blade structure is somewhat different in the outboard portion of the blade as compared with the inboard portion thereof (because of the difference in size of the spar section). Most accurate maintenance of the desired center of gravity location, therefore, requires small ballasting in the outer region of the blade.

The relative locations of the longitudinal axis of the spar, C. G. and C. P., as discussed above, are of further advantage since only a very small torsional moment in the spar is produced, and the centrifugal action on the blade during rotation lies on a line close to the spar axis. In accordance with the foregoing, the invention provides a substantially improved blade for aircraft sustaining rotors, in which a wide variety of aerodynamic and structural requirements are met, with the result that greater efficiency and smoother operation are afforded. The uniformly tapered plan form of the blade is of especial importance, particularly when combined with relative location of spar, center of gravity and center of pressure in a uniform manner in substantially any section of the blade throughout its length.

We claim:

1. A blade for an aircraft sustaining rotor including as its primary longitudinal structural element a step-tapered elliptical spar, and means carried by the spar and defining the blade contour, said means providing a blade plan form substantially uniformly tapered throughout at least a major portion of the length of the blade, the major axis of the spar section lying substantially in the plane of the blade, and the longitudinal axis of the spar being out of parallelism with the leading edge of the blade and spaced from the leading edge a distance in the neighborhood of one-quarter of the chord dimension at any blade section throughout the region of tapered plan form.

2. A blade in accordance with claim 1, in which the thickness is step-tapered in stages corresponding with those of the spar.

3. A blade in accordance with claim 1, in which the thickness of the blade is reduced in an outboard portion as compared with an inboard portion and having a sectional center of pressure both in said outboard portion and in said inboard portion located close to but offset rearwardly of the longitudinal axis of the spar.

4. A blade for an aircraft sustaining rotor including a spar and means carried by the spar and defining the blade contour, the spar being tapered in section, with a smaller spar section outboard of a larger section, the means defining the blade contour providing a tapered plan form, with a blade section of smaller chord positioned outboard of a section with a larger chord, and the longitudinal axis of the spar being closer to the leading edge of the blade in the region of smaller chord than in the region of larger chord, the spacing in both regions being in the neighborhood of one-quarter of the chord dimension.

5. A blade for an aircraft sustaining rotor including a spar and means carried by the spar and defining the blade contour, the spar being tapered in section, with a smaller spar section outboard of a larger section, the means defining the blade contour providing a tapered plan form, with a blade section of smaller chord positioned outboard of a section with a larger chord, the longitudinal axis of the spar being closer to the leading edge of the blade in the region of smaller chord than in the region of larger chord, the spacing in both regions being in the neighborhood of one-quarter of the chord dimension, and the thickness of the blade being reduced in an outboard portion as compared with an inboard portion and having a sectional center of pressure in both said portions close to but offset rearwardly of the longitudinal axis of the spar.

6. A blade in accordance with claim 4, in which the sectional center of gravity in both outboard and inboard regions of the blade lies approximately along the longitudinal axis of the spar and in which the sectional center of pressure of the blade in both outboard and inboard portions thereof lies close to but offset rearwardly of the sectional center of gravity.

7. A blade for an aircraft sustaining rotor including as its primary longitudinal structural member a tapered elliptical spar, an outboard section of which is smaller than an inboard section thereof, and means carried by the spar and defining a blade contour of tapered plan form and thickness, with a section of smaller chord and thickness positioned outboard of a section of larger chord and thickness, the longitudinal axis of the spar in both said outboard and inboard portions being offset rearwardly from the leading edge of the blade approximately 22% of the chord dimension, the sectional center of pressure in both said outboard and inboard portions of the blade being located approximately 25% of the chord dimension from the leading edge, and the blade contour defining means and the spar providing a sectional center of gravity in both said outboard and inboard portions of the blade intermediate the longitudinal axis of the spar and the center of pressure of the blade.

8. A blade for an aircraft sustaining rotor incorporating as its primary longitudinal structural member a drawn metal tube spar of step-tapered elliptical section, the spar being of substantially uniform section throughout a major portion of the inner two-thirds of the blade length and being provided with a plurality of taper steps in the outer one-third of the blade length, and blade contour defining means carried by said spar.

9. A blade for an aircraft sustaining rotor incorporating as its primary longitudinal structural member a drawn metal tube spar of step-tapered elliptical section, the spar being of substantially uniform section throughout a major portion of the inner two-thirds of the blade length and being provided with a plurality of taper steps in the outer one-third of the blade length, and blade contour defining means carried by said spar and providing a plan form substantially uniformly tapered throughout at least a major portion of the blade length.

10. A blade for an aircraft sustaining rotor incorporating a spar as a primary longitudinal structural element, and a plurality of transverse ribs mounted on the spar in spaced relation, the spar being of step-tapered elliptical form and having an outboard portion of smaller section than an inboard portion, the blade ribs in the outboard portion being of lesser depth than in the inboard portion, and a taper step of said spar being of such length as to lie between adjacent ribs at the junction of the outboard portion of smaller depth and the inboard portion of greater depth.

11. For an aircraft sustaining rotor, a rotor blade of aerofoil contour incorporating as its primary longitudinal structural member a tubular metallic spar and having blade contour defining means carried by said spar, said spar being of reduced cross-sectional dimension toward the tip region of the blade as compared with the root region thereof, and the blade contour being tapered in plan to a progressively reduced chord from adjacent the root region toward the tip region.

12. For an aircraft sustaining rotor, a rotor blade of aerofoil contour incorporating as its primary longitudinal structural member a tubular metallic spar and having blade contour defining means carried by said spar, said spar being of reduced cross-sectional dimension toward the tip region of the blade as compared with the root region thereof, the blade contour being tapered in plan to a progressively reduced chord from adjacent the root region toward the tip region, and said spar being positioned within the blade so that its longitudinal axis is located at an approximately uniform percentage of the blade chord throughout most of the blade length.

13. For an aircraft sustaining rotor, a rotor blade of aerofoil contour incorporating as its primary longitudinal structural member a tubular metallic spar of substantially elliptical section and having blade contour defining means carried by said spar, said spar being of reduced cross-sectional dimension toward the tip region of the blade as compared with the root region thereof, and the blade contour being tapered in plan to a progressively reduced chord from adjacent the root region toward the tip region.

14. For an aircraft sustaining rotor, a rotor blade of aerofoil contour incorporating as its primary longitudinal structural member a tubular metallic spar of substantially elliptical section and having blade contour defining means carried by said spar, said spar being of reduced cross-sectional dimension toward the tip region of the blade as compared with the root region thereof, the blade contour being tapered in plan to a progressively reduced chord from adjacent the root region toward the tip region, and said spar being positioned within the blade so that its longitudinal axis is located at an approximately uniform percentage of the blade chord throughout most of the blade length.

PAUL H. STANLEY.
AGNEW E. LARSEN.